Feb. 8, 1927. 1,617,277
A. SCHMIDT
MANUFACTURE OF PIPE BENDS
Original Filed April 10, 1924
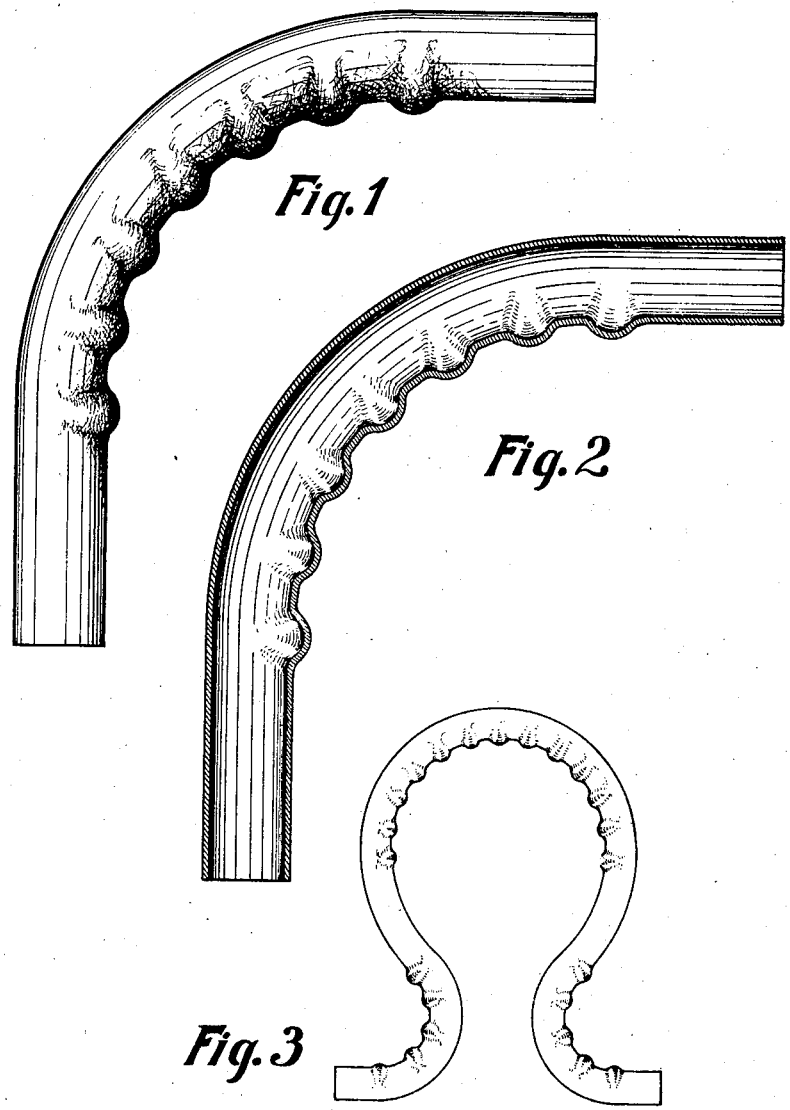
Inventor:
A. Schmidt
By Marks & Clerk
Attys Patented Feb. 8, 1927.

1,617,277

UNITED STATES PATENT OFFICE.

ALFRED SCHMIDT, OF DUSSELDORF, GERMANY.

MANUFACTURE OF PIPE BENDS.

Original application filed April 10, 1924, Serial No. 705,658, and in Germany June 6, 1923. Divided and this application filed April 16, 1926. Serial No. 102,585.

In steam piping, more particularly in the case of pipe lines for conveying superheated steam of high temperature, corrugated pipes are used for taking up the longitudinal expansion at the bends, as they give more readily than smooth bent steam piping. So-called expansion loops made of corrugated piping are also introduced into straight runs of piping. Such corrugated pipes are made by heating and cooling alternate zones of the pipe, the pipe being compressed axially. In order to eliminate the strains in the material due to the alternate heating and cooling, the finished pipe is finally annealed in the annealing furnace.

The ordinary corrugated pipes have various disadvantages, owing to the fact that the corrugations pass right round them. Owing to their great surface, the heat radiation is relatively great and eddies are formed by the corrugations in the flow of steam, which may cause considerable pressure losses when the velocity of the steam is great.

The present invention which is a division of applicant's co-pending application No. 705,658, filed April 10, 1924, has for its object to provide a thick walled pipe capable of acting as an expansion loop which will be free from the drawbacks above referred to, and the invention consists in a method of bending thick-walled pipes by locally heating portions of the wall of the pipe which is to form the inner side of the bend and bending the pipe. By this means a pipe is produced having outwardly extending bulges in its wall located only on the inner side of the bend.

In the accompanying drawing,

Figure 1 shows a side view of a pipe bend,
Figure 2 the same bend in section and
Figure 3 an expansion loop.

The pipes according to the invention are made by filling a steam pipe (patent-welded, seamless or the like) with sand and thereupon bending it in a cold or hot state, the place at which the crease is to be formed being specially heated by means of a welding burner or the like. Owing to the pipe being filled with sand, the place thus heated will bulge outwards. In this manner one crease after another is formed, the first crease, the third crease and so on being preferably first formed and the intermediate creases subsequently.

In these bends the creases lie only along the inner side of the bend and vanish in the neighborhood of the neutral axis, leaving the outer part of the bend free. Where the pipe is no longer bent, but straight, there are no creases. Hence the radiation surface is considerably smaller than is the case in corrugated pipes. One great advantage is that eddying in the flow of steam is very greatly reduced. Owing to centrifugal force the steam has the tendency to slide along the outer curve of the bend, which is smooth in pipes made according to the present invention. The material is less stressed in the process of manufacture than is the case in corrugated pipes, as there is no alternate heating and simultaneous cooling of adjacent zones and no axial compression of the material. Hence, the durability is greater than in the case of corrugated pipes, while the cost of manufacture is less. The resilience is at least as great as in the case of corrugated pipes. The durability is greater than is the case with smooth bends, as the wall of the bend is not extended at the outer periphery and is therefore not weakened, the material being compressed on the inner side of the bend and taken up by the creases.

What I claim is:—

1. A method of bending thick-walled pipes, consisting in successively heating spaced portions of the pipe on the side which is to form the inside of the bend, and bending the pipe by a small amount each time after a portion of the pipe is heated, thereby causing the heated portion to bulge outwardly.

2. A method of bending thick-walled pipes, consisting in filling the pipe with sand, successively heating spaced portions of the pipe on the side which is to form the inside of the bend, and bending the pipe by a small amount each time after a portion of the pipe is heated, thereby causing the heated portion to bulge outwardly.

3. A method of bending thick-walled pipes, consisting in filling the pipe with sand, locally heating portions of the wall of the pipe, which are to form alternate bulges on the inner side of the bend, partially bending the pipe, heating the portions of the pipe wall intermediate of the said alternate bulges and completing the bend, as set forth.

In testimony whereof I have signed my name to this specification.

ALFRED SCHMIDT.